United States Patent

[11] 3,575,255

[72] Inventor Svante Theodore Wickstrom
East Oakdale Township, Washington County, Minn.
[21] Appl. No. 766,863
[22] Filed Oct. 11, 1968
[45] Patented Apr. 20, 1971
[73] Assignee Minnesota Mining and Manufacturing Company
St. Paul, Minn.

[54] AUTOMOBILE GUIDANCE SYSTEM
13 Claims, 6 Drawing Figs.
[52] U.S. Cl. ................................................. 180/98,
340/32, 94/1, 180/105, 180/79
[51] Int. Cl. ............................................. B60k 31/00
[50] Field of Search ......................................... 180/98, 82
(E), 77, 79, 79.1, 105; 340/31, 53, 32; 246/63;
24/182

[56] References Cited
UNITED STATES PATENTS
2,074,251  3/1937  Braun ............................ 340/53
2,493,755  1/1950  Ferrill ............................ 180/79.1X
2,576,424  11/1951 Sunstein ........................ 246/63
2,661,070  12/1953 Ferrill ............................ 180/79.1X
2,750,583  6/1956  McCullough ................. (94/1.5UX)
3,029,893  4/1962  Mountjoy ....................... 180/98
3,085,646  4/1963  Paufve ........................... 180/98
3,101,175  8/1963  Brown ............................ (180/79.7UX)
3,340,950  9/1967  Hopengarten ................. 180/105

Primary Examiner—Kenneth H. Betts
Attorney—Kinney, Alexander, Sell, Steldt & Delahunt ABSTRACT: A method for controlling the speed and direction of an automobile on a highway. The highway is provided with an essentially continuous magnetizable stripe extending in the direction of travel, with the stripe being magnetized with a sequency of magnetic poles alternating in polarity and located along the highway according to a predetermined frequency; preferably the stripe is provided by painting a mixture of organic polymeric binder material and magnetizable particles on the highway. The automobile is provided with two magnetic-flux-sensors arranged to straddle the magnetizable stripe and pass through the fields above the stripe and develop an alternating electric signal having a frequency determined by the spacing between the magnetic poles and by the speed of the automobile. Speed and direction-controlling means in the automobile receive the signal generated in the magnetic-flux-sensors and change the speed and direction of the automobile in proportion, respectively, to the amount that the total flux-sensor-derived signal varies as to frequency from a standard and to any difference in amplitude of the derived signals of the two sensors.

PATENTED APR 20 1971 3,575,255
SHEET 1 OF 2
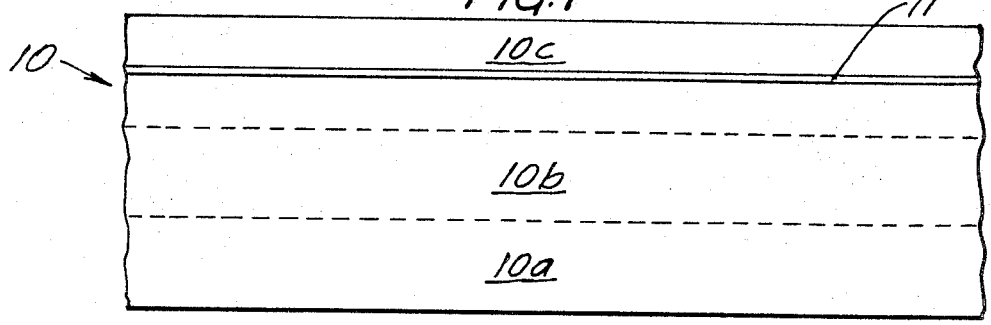
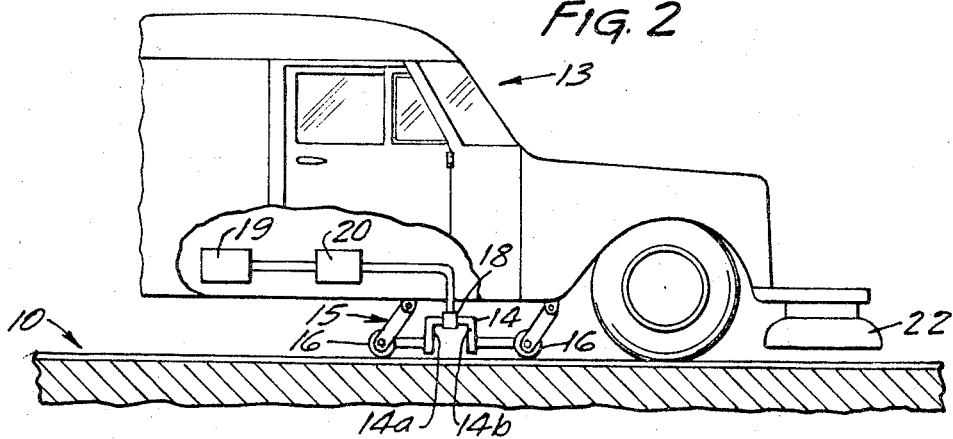
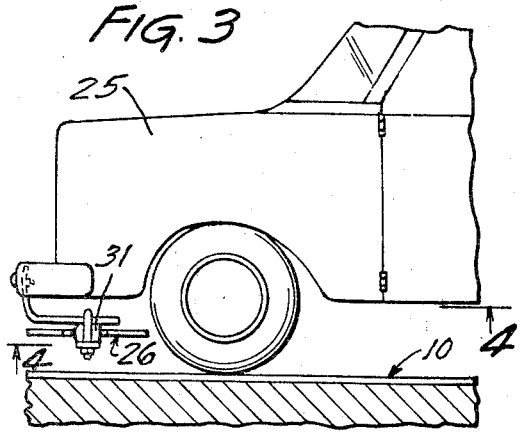
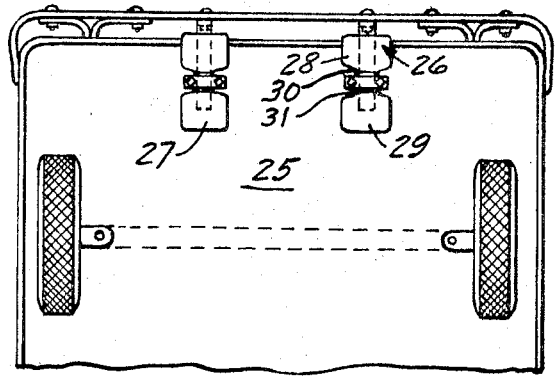
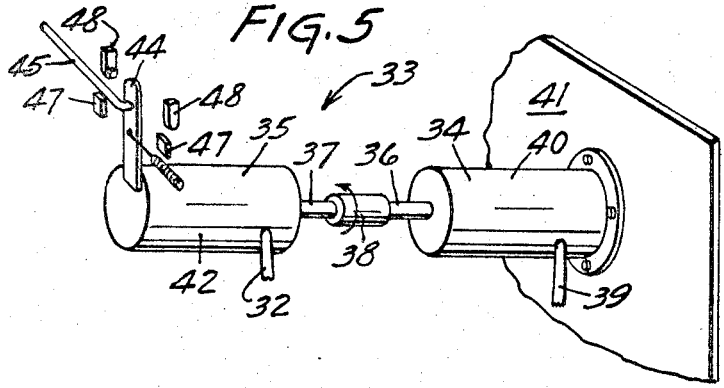
INVENTOR.
S. THEODORE WICKSTROM
BY Kinney, Alexander,
Sell, Steldt & DeLaHunt
ATTORNEYS

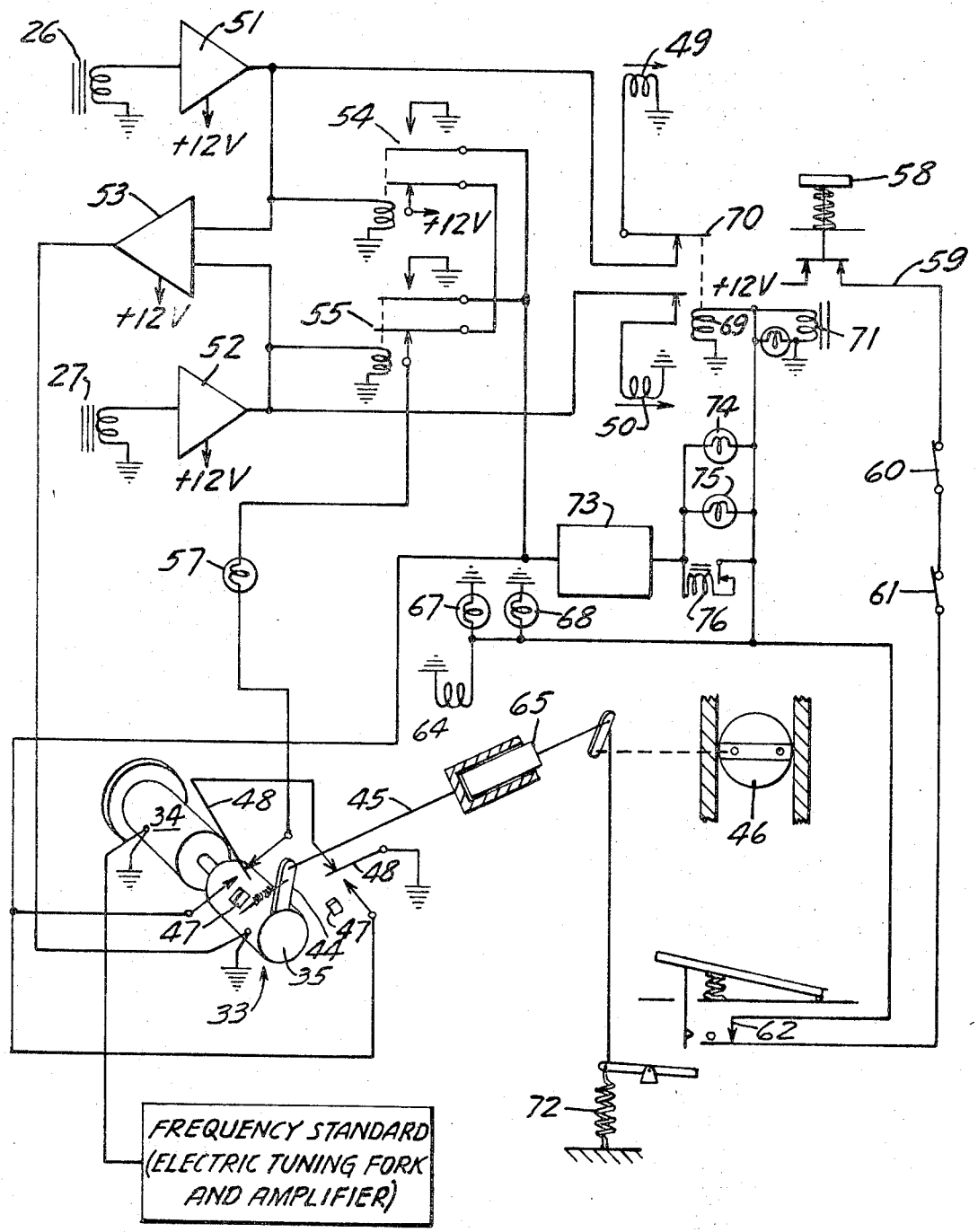

AUTOMOBILE GUIDANCE SYSTEM

BACKGROUND OF THE INVENTION

The desire to make automobile driving on highways more safe and easy has led to various suggestions for automatically guiding automobiles. Several of these suggestions have involved forming a path just above the surface of the highway of individual, short, closely spaced magnetic fields that alternate in polarity. An automobile to be guided is equipped with flux-sensors, and, as the auto travels along the highway, the flux-sensors pass through the fields and generate an electric signal that is dependent as to frequency on the spacing of the fields and the rate of travel of the auto. In one common proposal, current developed in a frequency discriminator as a result of any difference between the frequency of the flux-sensor-derived signal and the frequency at which the discriminator is set is used to operate the throttle of the automobile. Sometimes a pair of transversely spaced flux-sensors are included in the auto and arranged to straddle the fields, and any difference in magnitude of the signal developed in each of the sensors is used to steer the auto.

In some proposed systems, the sequence of magnetic fields along and just above the surface of the highway is formed by one or more electric conductors buried in the highway and looped so as to alternate the polarity of the fields generated by current traveling through the conductor; see, for example, U.S. Pat. Nos. 2,493,755 and U.S. Pat. No. 3,029,893. It has also been suggested that the fields be generated by a series of permanent bar magnets embedded in the highway; see U.S. Pat. No. 2,493,755.

In a similar suggested system, ferromagnetic strips are embedded in the highway and closely spaced at regular intervals. A transformer is provided in an auto that is to be guided, and as the transformer passes over the spaced strips the reduced reluctance for the field of the transformer causes peaks to develop in the current carried in the transformer at a frequency that is dependent on the spacing of the strips and the rate of travel over the strips; any difference between the frequency of this developed signal and a standard frequency is detected by a frequency discriminator and used to adjust the speed of the auto; see, for example, U.S. Pat. No. 3,085,646.

A principal disadvantage of these suggested systems is that the means in the roadway for causing the generation of an electric signal representative of the rate at which an auto is traveling is expensive to install and maintain. The embedding operation is costly and, in addition, it is generally limited to new highways or highways being repaved. Further, the materials embedded are also costly, and, for the conductor system, electric power is required to supply the current.

Further, these systems provide an unchangeable pattern of magnetic fields, and therefore permit the setting of only a single standard speed. If weather, road, or traffic conditions dictate a temporary or permanent change in the speed at which autos travel over the highway, there is no way to automatically guide the autos at the new speed.

SUMMARY OF THE INVENTION

The present invention provides a new system for providing a series of magnetic signals along a highway to control the speed and direction of an automobile. In this system, a continuous, magnetizable stripe, preferably a painted line, is applied on the surface of the highway; generally it is applied in the center of each lane in which speed and direction is to be controlled. The stripe is magnetized at a series of closely spaced points or areas located according to a predetermined frequency that can either be constant or vary along the length of the highway; the points of magnetization alternate in polarity. Magnetic-field or flux-sensors in an automobile traveling over the stripe develop an alternating signal, and the frequency of this developed signal is compared with a standard; any difference is used to change the speed of the automobile. Preferably an automobile traveling over the highway includes two laterally spaced flux-sensors which straddle the magnetized stripe, and any difference between the amplitude of the two signals developed is used to steer the auto.

Despite the large research that has been performed in automobile guidance, no one, insofar as is known, has previously suggested painting or otherwise applying an essentially continuous magnetizable stripe on a highway, and no one has recognized that doing so would provide the basis for a workable, economical system of automobile guidance. It had been suggested in U.S. Pat. Nos. 2,576,424 and 2,661,070 to magnetize a rail of a railroad track with pulses in order to control the speed of a train, and the latter patent contains a suggestion to lay a magnetized wire on a highway and use it to control the speed and guide the direction of an automobile. But the laying of a wire on a highway presents difficulties in installation and maintenance, and U.S. Pat. No. 2,661,070 contains a very limited discussion of the installation of the magnetized wire suggested in that patent. Nothing in these previous teachings suggested the use on a highway of a rather thin organic magnetizable stripe such as a paint stripe nor the advantages to be obtained by such a use.

This new system for providing a series of magnetic fields along a highway is much more inexpensive than the previous systems and yet it is superior in features. Magnetizable paint is itself inexpensive and it may be quickly and simply applied by conventional equipment; in addition, it may be applied to either existing or new highways. No power source is required to maintain the signal produced by the stripe. The speed at which traffic is to be controlled can be conveniently changed daily or oftener to accord with temporary weather, road, or traffic conditions by simply driving a vehicle over the stripe with a magnetizing unit carried near the roadway; or the pattern may be left for an extended period. Whereas the previous systems for controlling speed and direction of an auto have been quite impractical and unlikely of accomplishment, the system of this invention is highly practical and provides a basis for the development of widespread automobile guidance.

Magnetizable stripes on highways magnetized with an information-providing pattern of polarity are useful to provide other kinds of control information to an automobile traveling on the highway. For example, magnetizable stripes located in or at the edge of a lane of travel and magnetized with a sequence of magnetic poles of alternating polarity, or with continuous adjacent lines of opposite polarity running the length of the stripe, are useful to warn drivers when they dangerously approach the edge of the lane; a magnetometer in the auto, for example, indicates when the auto is no longer straddling a stripe in the center or is approaching a stripe at the edge of the lane.

DRAWINGS

FIG. 1 is a top view of one half of a limited-access, six-lane, divided highway of this invention;

FIG. 2 is a schematic elevation of a vehicle for magnetizing a magnetizable stripe on a highway of this invention;

FIG. 3 is a schematic elevation of a portion of an auto automatically guided according to this invention;

FIG. 4 is a view of the auto of FIG. 3 taken along the line 4—4 in FIG. 3;

FIG. 5 is a schematic perspective view of a frequency differential-accumulator of this invention by which the frequency of the developed signal is compared with a standard frequency and the speed of the auto changed; and FIG. 6 is a schematic wiring diagram of electric circuitry useful to operate the automatic guidance equipment of an auto guided according to this invention.

FIG. 1 shows a top view of the right-hand half 10 of a limited-access, six-lane, divided highway of this invention. Only one of the three lanes that form the right-hand half of the highway is controlled; that lane, 10c, has a continuous stripe 11 of magnetizable material down the center. The stripe 11 may be provided in various ways. For the most convenient and least expensive method of application, as noted above, the stripe 11 is formed from a magnetizable paint that comprises magnetizable particles such as ferromagnetic oxides or iron filings dispersed in a vehicle that generally includes an organic polymeric film-forming binder material dissolved in a volatile solvent. Quite a variety of binder materials are useful, including resin-modified drying oils and alkyd, polyurethane, urea, allyl and epoxy resins. To avoid the need for high amplification, it is desirable that a stripe of medium thickness contain at least 30 and preferably 40 volume-percent magnetizable particles, though a quite thick stripe can include less magnetizable particles, such as 20 volume-percent. So that paint will flow well and form a tough, adherent film, the volume-percent of particles, including any pigments and fillers, should generally not exceed 75 volume-percent.

The thickness of a paint film formed on the highway is typically between 10 and 30 mils. Thicker magnetizable stripes are also useful, though if the stripe is much thicker than 150 mils, magnetization of its whole thickness is much less convenient. The thicker the magnetized stripe, the lesser is the amplification required for signals developed in the flux-sensors of the controlled automobile and the greater is the life of the stripe. The stripe is also given additional life by painting a tough film not filled with magnetizable particles over the magnetizable paint stripe and by cutting a channel in the highway and applying the stripe in the channel. Instead of a painted stripe, a metal foil or an organic polymeric preformed sheet in which magnetizable particles are embedded or on which they are coated is also used as the magnetizable stripe 11, and such a foil or sheet may be magnetized before application to the roadway.

FIG. 2 illustrates one form of vehicle 13 for magnetizing a magnetizable stripe of frequency invention on the roadway. This vehicle has an electromagnet 14 mounted on a carriage 15 beneath the vehicle in close proximity to the surface of the highway 10. Preferably the electromagnet is less than one inch from the surface of the highway, though greater distances can be used by supplying high power to the winding of the electromagnet; where quite thick magnetizable stripes are used, and it is desired to magnetize the whole thickness of the stripe, the electromagnet may be in contact with the stripe. As shown, the carriage 15 may include wheels 16 that ride on the highway. Current supplied the electromagnet 14 from a battery 19 is broken at a constant rate by a slip ring and commutator device 20 into pulses that alternate in direction, so as to form spaced magnetized areas or magnetic poles along the stripe 11. The frequency of the current pulses may be chosen so that the evenly spaced poles formed by the trailing arm 14a of the electromagnet are left on the stripe and the poles formed by the forward arm 14 b are erased. Or the frequency of the pulses may be such that when the arms 14a and 14b are energized, they do not overlap the previously established magnetic poles, whereupon spaced sets of N-S poles will be left along the stripe; in that case the signal generated in the flux-sensors may be modified by circuitry in the controlled vehicle to have a constant wavelength. Instead of magnetizing spaced points of the stripe 11, a sinusoidal pattern may be magnetized in the stripe by application of a sinusoidal signal to the electromagnet, or the electromagnet may be energized from a capacitive discharge system.

For the most practical operation of the system, the surface induction established at the magnetized points should have an intensity of at least two gauss, and preferably an intensity of at least 10 gauss. The points of orientation should be spaced some distance from one another so that the field established between them will be of good height, and yet not be spaced so far apart that the sensing mechanism does not respond quickly enough; preferably the adjacent oppositely oriented points along the stripe are between about 3 and 15 to 20 inches apart. The vehicle 13 may include a demagnetizing electromagnet 22 to remove previous magnetization of the stripe. When remagnetizing a stripe, the magnetizing vehicle 13 may itself be steered automatically through use of the previous magnetization of the stripe.

An automobile or other vehicle adapted to be controlled according to this invention, such as the vehicle 25 shown in FIGS. 3 and 4, includes at least one magnetic-field- or flux-sensor, located near the surface of the highway 10 so as to minimize the strength of field that must be established by the stripe 11 and minimize the amplification required for the signal developed by the flux-sensor; preferably the flux-sensor is movable and can be lowered to within 8 inches of a smooth-surfaced highway. The vehicle 25 shown in FIGS. 3 and 4 has two flux-sensors 26 and 27, laterally spaced as shown in FIG. 4 for use in a steering control. The flux-sensors should be placed as far forward as possible, preferably in front of the front axle, so that they quickly sense any change of direction of the auto. The flux-sensors may take various forms, but those illustrated each include two large vanes 28 and 29 of ferromagnetic material formed from the same plate or a sandwich of plates. The vanes, which gather and concentrate the magnetic field through which they pass, are connected by a narrow intermediate portion 30 of the plate or sandwich of plates, and a conductive coil 31 is wrapped around this connecting intermediate portion of the plates.

The signals developed in the two flux-sensors 26 and 27 by passage through the magnetic fields above a magnetized stripe 11 are amplified and combined and then fed to a speed-controlling mechanism, which preferably incorporates a device called a frequency differential-accumulator. This device includes two synchronous electric motors, a "reference" and an "actuating" motor, with the windings of the reference motor being supplied from a source of alternating current having a standard reference frequency, and the windings of the actuating motor being supplied by the flux-sensor-derived signal. It will be seen that the rates at which the rotating parts of the motors are driven correspond when the frequency of the derived and standard signals correspond. Either the armature or the stator of the actuating motor is fixed with respect to either the armature or stator of the reference motor. The other, nonfixed one, of the armature and the stator of the actuating motor is free to rotate and its rate of rotation differs from the rate of rotation of the other of the stator and armature of the reference motor (which may be zero) in proportion to any lack of correspondence between the driving rates of the actuating and reference motors.

In the illustrated frequency differential-accumulator 33, the armatures of the reference and actuating motors, 34 and 35, respectively, are connected by connecting their shafts, 36 and 37, respectively, with a rigid coupling 38. The external housing or body 40 of the reference synchronous motor 34 is mounted on and fixed with respect to the body 41 of the automobile 25 and the windings of the reference motor are supplied through conductors 39 from a source of alternating current having a standard reference frequency (such as a reference oscillator that incorporates a precision tuning fork). The actuating synchronous motor 35 is supported only by its shaft 37, and the windings of the motor are supplied by the signal developed in the flux-sensors 26 and 27. The shaft of the reference synchronous motor is driven at a constant rate determined by the reference frequency of the signal supplied it. If the frequency of the flux-sensor-derived signal is different from the frequency of the standard signal, the frequency of the electromotive force developed in the stator of the actuating synchronous motor 35 does not correspond to the rate at which the shaft of the actuating motor is actually being driven through its connection to the reference motor. The result is that the body 42 of the actuating motor 35 rotates to maintain its proper relationship to its shaft 37.

A lever 44, serving as an output member, is fixed to the body 42 of the actuating synchronous motor and turns as the body of the motor turns. A linkage 45, including an electromagnetic coupling 65 (not shown in FIG. 5) that may be deenergized when the auto is not being controlled by the automatic guidance mechanism, extends from the lever 44 to the throttle valve 46 of the automobile's carburetor so that rotation of the body 42 of the actuating synchronous motor 35 causes an opening or closing of the carburetor throttle valve.

If the vehicle 25 is traveling at a speed below the standard one for the highway being traveled, the frequency of the signal generated in the flux-sensors 26 and 27 will be less than the standard frequency and the body of the actuating synchronous motor will rotate counterclockwise in FIG. 5 to open the throttle valve. The speed of the vehicle 25 will then increase until the frequency of the derived signal is slightly more than the frequency of the standard whereupon the body of the actuating synchronous motor will rotate clockwise in FIG. 5 to close the throttle valve somewhat. After a short time, the body of the actuating synchronous motor will find its proper location to maintain the speed of the automobile at the standard speed, after which the lever and carburetor throttle valve will tend to remain at a steady position so long as the standard speed for the highway remains constant.

Other speed controlling mechanisms may be used to vary the automobile engine power with changes in the frequency of the derived signal. For example, frequency discriminators in which a direct current is produced when the derived signal differs in frequency from that to which the discriminators are tuned are contemplated in automobile guidance systems of the invention. However, this method of comparing a flux-sensor-derived signal with a standard signal is only satisfactory when it is not necessary to maintain precise spacing of vehicles which follow each other closely. Since frequency discriminators can only yield direct current outputs to operate throttle actuating devices, it is impossible to avoid cumulative error or "slip" in those systems.

A system such as the frequency differential-accumulator 33 is preferred. The frequency differential-accumulator has a memory for small cumulative frequency errors which at any instant relates the vehicle's location along the road to the location it should have at any instant in time. This memory manifests itself in the angle which lever 44 assumes at any particular instant. As an example, assume that the synchronous motors 34 and 35 have 72 poles. For each polarity reversal of the electric signals, the motors will rotate 5°. Suppose that the magnetic poles on the road stripe are spaced at 9 inch intervals. If for some reason such as travel uphill, the vehicle loses speed so that it lags 27 inches (3 reversals) in comparison to the location it should have at that instant, the body 42 of the derived-signal motor 35 will have rotated 15° less than the standard, thereby advancing the throttle valve through lever 44 to increase speed. The speed increases until the three lagging pole reversals have been recovered, at which point the lever 44 is in its former position. The "memory" for the 3 lagging pole reversals has thereby been satisfied.

As will be understood, the body 42 of the actuating motor 35 and the attached lever 44 should be able to rotate freely for satisfactory operation of the frequency differential-accumulator 33. Stops 47 are fixed on both sides of the lever 44 in the path that the lever travels to define the extent of pivoting of the lever. Instead of being directly connected to the body 42 of the synchronous motor 35, the lever 44 may be connected to the body by a gear train that reduces the angular travel of the lever 44 for a given angle of rotation of the body 42. Such a reduction in the travel of the lever 44 is especially desirable where synchronous motors having a low number of poles are used. In the ordinary course of operation of the frequency differential-accumulator 33, the lever should never reach these stops. Electric switches 48 are mounted adjacent each stop and operate devices that warn the driver to deactivate the automatic guidance mechanism. A return spring returns the throttle to idle position when the automatic guidance system is switched out of operation.

If the shaft rather than the body of the first synchronous motor is fixed with respect to the automobile, and the bodies of the two motors coupled to one another, then the shaft of the second synchronous motor carries the lever that controls the carburetor throttle valve. Or, if the body of the first motor is fixed to the automobile body, but the shaft of the first motor is coupled to the body of the second motor, then the lever 44 will be carried on the shaft of the second motor. In another arrangement, the bodies of both synchronous motors are fixed to the automobile body, and the lever 44 is mounted on a shaft that is connected to the two shafts of the motors by a differential gear train. Other arrangements are contemplated for coupling the frequency differential-accumulator to the carburetor throttle and valve; for example, the lever 44 can operate the valve of a vacuum actuator which in turn moves the carburetor throttle valve; such an arrangement requires less power from the synchronous motor and amplifiers.

With an automobile that has traveled constantly under the control of a frequency differential-accumulator 33, the number of rotations of the coupled shafts will be directly proportional to the number of changes in polarity traversed by the vehicle, and that number will be directly proportional to the distance traveled by the car, assuming that the standard speed does not vary over the course. Odometers or devices to indicate the arrival of an auto at a particular exit may be driven by the coupled shafts of the motors, for example, since the number of their rotations provides a basis for measuring distance traveled that is independent of tire inflation or wheel slip. If the frequency of the standard current is derived from an electrically driven tuning fork having an accuracy of 0.001 percent, which is readily obtainable, two cars traveling behind each other should not change distance by more than 11 feet in 100 miles. Instead of a source of standard frequency in an automobile, the standard frequency can be broadcast by radio and received by a radio receiver in the auto, thereby eliminating even this small error.

Steering of the automobile 25 is controlled by comparing the signal developed in each of the flux-sensors 26 and 27. In the embodiment illustrated, the signal from each flux-sensor 26 and 27 is amplified and then fed to opposed solenoid valves in the car's hydraulic power steering system. If the auto is too far to the left of the stripe, the voltage developed by the left flux-sensor 26 will be less than that of the right flux-sensor 27, and the force of the left solenoid will be less than that of the right solenoid. As a result, the left steering valve will be overpowered by the right steering valve and the car will steer right. The car will then return across the stripe until the voltage developed by the left flux-sensor is greater than that developed by the right flux-sensor, whereupon the car will begin to return to the left. This hunting of the car to place its center over the stripe will be continual but quite small in magnitude.

In other embodiments of the invention, the flux-sensor-derived signals are fed to a two-coil balanced-armature relay which switches direct current from the automobile battery to only one solenoid-controlled steering valve at a time. In other embodiments, the balanced-armature-relay switches current to two electric motors that are coupled to the steering shaft; or such electric motors, or a single reversible-direction motor, may be operated directly from the flux-sensor-derived signals.

FIG. 6 shows a diagram of the electric circuitry that may be used with the apparatus of the automobile guidance system illustrated for the automobile 25. As shown in the diagram, the two flux-sensors 26 and 27 are each connected to amplifiers 51 and 52, respectively. The amplified signals travel to a mixing amplifier 53 where they are combined and further amplified and then conducted to the second synchronous motor 35 of the frequency differential-accumulator 33. The signals also travel to threshold relays 54 and 55, respectively, and if the signals are high enough in magnitude, they operate the threshold relays to the condition shown in FIG. 6.

Thus, when an automobile 25 travels on highway 10 in adequately close proximity to the stripe to obtain control signals of useable amplitude, the flux-sensors 26 and 27 develop a signal that actuates the threshold relays. In all likelihood, when an automobile begins travel on a controlled highway, the lever 44 will be resting against one of the stops 47 and switch 48. The driver has been advised of the speed required to travel on the highway by reading signs, maps, or other ways and he accelerates or slows his car to that speed.

As the car reaches and moves slightly above or below the control speed, the discrepancy in frequency between the flux-sensor-derived signal and the standard signal causes the lever 44 to lift off the stop 47 and actuate the switch 48, whereupon a range light 57 mounted on the dashboard of the automobile and electrically connected from the threshold relay 55 through the switches 48 to ground, is illuminated. (In an alternative arrangement, the driver may, through operation of a switch or button mounted on the dashboard, actuate a mechanism to center the lever 44 between the steps 47.)

Illumination of the light 57 indicates to the driver of the automobile that he may switch on his automatic guidance system. He does so by pushing the button 58, which is also mounted on the dashboard. Closing the pushbutton 58 completes a circuit from the automobile battery to ground through line 59 and switches 60, 61, and 62, and then through various parts of the automobile guidance system: the coil 64 of a solenoid-based magnetic coupling 65 that connects the lever 44 of the frequency differential-accumulator to the throttle valve of the carburetor; two external lamps 67 and 68 which reveal to other vehicles that the vehicle 25 is being controlled by an automatic guidance system; the coil 69 of a double-pole relay 70 to complete a circuit connecting the flux-sensors 26 and 27 with auxiliary power steering valves 49 and 50; and the coil 71 of a solenoid that holds the button 58 in closed position. With the system thus energized, signals developed in the flux-sensors 26 and 27 are compared to a standard frequency by means of the frequency differential-accumulator 33 to operate the lever 44 and control the speed of the automobile.

The vehicle 25 may be taken out of the control of the automatic guidance system by several alternative ways. If the operator of the vehicle either presses the brake pedal or the accelerator pedal, or moves the steering wheel, he opens one of the switches, 60, 62, and 61, respectively. Thereupon, the magnetic coupling 65 between the frequency differential 33 and the throttle valve 46 is disconnected (whereupon a return spring 72 tends to return the throttle valve to the idle position); the solenoid 69 for the relay 70 is deenergized so that the flux-sensors 26 and 27 no longer operate the auxiliary power steering valves 49 and 50, and the coil 71 is deenergized, releasing the button 58.

The operator may remove the automobile at his own volition or he may be warned to do so. For example, if the system is malfunctioning in some way so that the second synchronous motor 35 gets too far behind the first, the lever 44 will strike one of the switches 48 and switch it from its position in FIG. 6. Thereupon, the dashboard light 57 will darken and a circuit to ground will be completed through a thermal flasher 73, the tail light 74 of the automobile 25, a "take-control" light 75 mounted on the dashboard, and a warning buzzer 76. The driver will then assume control of the car and perhaps steer it out of the controlled lane.

The invention is further illustrated by the following example. A paint stripe was formed on the highway 8 mils thick, 6 inches wide and including 75—80 weight-percent (about 40 volume-percent) magnetic iron oxide ($Fe_2O_3$) particles dispersed in a polyurethane binder material. The stripe was magnetized with sets of N-S poles, with the centers of the sets 12 inches apart and the poles of each set 4 inches apart; the surface induction at the poles had an intensity of 10 gauss. A flux-sensor was attached to an automobile so as to be spaced 4½-inches above a roadway. The flux-sensor was a ⅛-inch thick sandwich of several plates of oriented-grain transformer steel and had overall width and length dimensions of 5 and 9 inches, respectively; at the center of the flux-sensor, over a 1⅛-inch length, the width of the sandwich of plates was reduced to 1½-inches, and around this reduced portion were wound 18,000 turns of No. 44 magnet wire. With the automobile driven at 30 miles per hour along the roadway and with the flux-sensor aligned over the stripe, an electric signal of 100 millivolts, which was appropriate upon amplification to control the speed and direction of the auto, was developed in the coil of the flux-sensor.

I claim:
1. A method for controlling the speed of a vehicle on a roadway comprising:
   1. providing an essentially continuous stripe of magnetizable material extending in the direction of travel along the roadway, the stripe comprising an organic polymeric matrix and, in an amount totaling at least 40 volume-percent of the stripe, magnetizable particulate material dispersed in the matrix;
   2. magnetizing the stripe with a sequence of magnetic poles located along the roadway according to a predetermined spacing, adjacent poles being of opposite polarity and the magnetic surface induction at each pole having an intensity of at least 2 gauss;
   3. incorporating magnetic-flux-sensing means on the vehicle in a position to pass through the magnetic fields above the stripe and develop a pulsating electric signal having a frequency determined by the spacing between the magnetic poles and by the speed of the vehicle; and
   4. providing speed-controlling means in the vehicle for (a) receiving the signal generated in the magnetic-flux-sensing means, (b) comparing its frequency with a standard frequency, and (c) changing the speed of the vehicle to make the signal generated in the magnetic-flux-sensing means correspond to the standard frequency.

2. A method of claim 1 in which the adjacent poles along the magnetizable stripe are spaced between 3 and 16 inches.

3. A method of claim 1 in which the continuous magnetizable stripe is provided by painting on the highway a paint composition comprising (a) an organic polymeric binder that forms a durable adherent film, and (b) magnetizable particulate material dispersed in the binder.

4. A method of claim 3 in which the stripe is applied in a channel in the roadway.

5. A method of claim 3 in which the magnetizable stripe formed is between 10 and 150 mils in thickness and comprises at least 40 volume-percent magnetizable particles and in which the adjacent poles along the stripe are spaced between 3 and 20 inches, and the magnetic surface induction at each pole is at least 10 gauss.

6. A method for providing control information to a vehicle traveling on a roadway comprising:
   1. providing a stripe of magnetizable material along the roadway, the stripe comprising an organic polymeric matrix and, in an amount totaling at least 20 volume-percent of the stripe, magnetizable particulate material dispersed in the matrix;
   2. magnetizing the stripe with an information-providing pattern of polarity, the magnetic surface induction at each magnetic pole having an intensity of at least 2 gauss;
   3. incorporating magnetic-flux-sensing means on the vehicle in a position to pass through the magnetic fields above the stripe and thereby develop an electric signal dependent on the pattern of polarity of the stripe; and
   4. providing mechanism in the vehicle actuated by the electric signal developed in the magnetic-flux-sensing means.

7. A method of claim 6 in which the stripe is provided by painting on the roadway a paint composition that comprises: (a) an organic polymeric binder that forms a durable adherent paint film, and (b) magnetizable particulate material dispersed in the binder.

8. A method of claim 7 in which the stripe is applied in a channel in the roadway.

9. A method of claim 6 in which the stripe is applied in a channel in the roadway.

10. A method of claim 1 in which the speed-controlling means includes memory means for providing an output that is representative of the accumulated difference between the number of pulsations in the signal generated in the magnetic-flux-sensing means and the number of pulsations that would make the signal generated in the magnetic-flux-sensing means correspond to the standard frequency, and the speed-controlling means tends to change the speed of the vehicle until said accumulated difference is canceled.

11. A method for providing control information to a vehicle that is traveling on a roadway and carries within it (a) magnetic-flux-sensing means to develop electric signals in accordance with a pattern of magnetic fields above the roadway, and (b) mechanism actuated by the electric signals developed in the magnetic-flux-sensing means, the method comprising providing a pattern of magnetic fields above the roadway by
   1. painting on the roadway a paint composition that comprises: (a) an organic polymeric binder that forms a durable adherent paint film, and (b) magnetizable particulate material dispersed in the binder; and
   2. magnetizing the applied paint composition with an information-providing pattern of polarity, the magnetic surface induction at each magnetic pole having an intensity of at least 2 gauss.

12. A method for controlling the speed of a vehicle that is traveling on a roadway and carries within it magnetic-flux-sensing means and speed-controlling means connected to the magnetic-flux-sensing means, whereby when the vehicle passes through a sequence of magnetic fields emanating from magnetic poles located along the roadway according to a predetermined spacing, adjacent poles being of opposite polarity, the magnetic-flux-sensing means develops a pulsating electric signal having a frequency determined by the spacing between the magnetic poles and by the speed of the vehicle, and the developed signal may be compared in the speed-controlling means with a standard frequency and the speed of the vehicle changed to make the signal generated in the magnetic-flux-sensing means agree with the standard frequency, the method comprising:
   1. providing an essentially continuous stripe of magnetizable material extending in the direction of travel along the roadway by painting on the roadway a paint composition that comprises (a) an organic polymeric binder that forms a durable adherent film, and (b) magnetizable particulate material dispersed in the binder; and
   2. magnetizing the stripe with a sequence of magnetic poles as described, the magnetic surface induction at each magnetic pole having an intensity of at least 2 gauss.

13. A method for controlling the speed of a vehicle on a roadway comprising:
   1. providing a sequence of magnetic poles extending in the direction of travel along the roadway and located along the roadway according to a predetermined spacing, adjacent poles being of opposite polarity;
   2. incorporating magnetic-flux-sensing means on the vehicle in a position to pass through the fields above the magnetic poles and develop a pulsating electric signal having a frequency determined by the spacing between the magnetic poles and by the speed of the vehicle; and
   3. providing speed-controlling means in the vehicle for (a) receiving the signal generated in the magnetic-flux-sensing means, (b) comparing its frequency with a standard frequency, and (c) changing the speed of the vehicle to make the signal generated in the magnetic-flux-sensing means correspond to the standard frequency, the speed-controlling means including memory means for providing an output that is representative of the accumulated difference between the number of pulsations in the signal generated in the magnetic-flux-sensing means and the number of pulsations that would make the signal generated in the magnetic-flux-sensing means correspond to the standard frequency, and the speed-controlling means tending to change the speed of the vehicle until said accumulated difference is canceled.